(12) United States Patent
Kaneda et al.

(10) Patent No.: US 10,915,283 B2
(45) Date of Patent: Feb. 9, 2021

(54) COMMUNICATION DEVICE, CONTROL METHOD, AND NON-TRANSITORY COMPUTER-READABLE STORAGE MEDIUM FOR PRINT JOB WITH POST-PROCESSING

(71) Applicant: CANON KABUSHIKI KAISHA, Tokyo (JP)

(72) Inventors: Takeshi Kaneda, Funabashi (JP); Takahiro Matsushita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/380,802

(22) Filed: Apr. 10, 2019

(65) Prior Publication Data

US 2019/0317711 A1 Oct. 17, 2019

(30) Foreign Application Priority Data

Apr. 13, 2018 (JP) ................................. 2018-077925

(51) Int. Cl.
*G06F 3/12* (2006.01)

(52) U.S. Cl.
CPC .......... *G06F 3/1264* (2013.01); *G06F 3/1205* (2013.01); *G06F 3/1256* (2013.01); *G06F 3/1292* (2013.01)

(58) Field of Classification Search
None
See application file for complete search history.

(56) References Cited

U.S. PATENT DOCUMENTS

| 2007/0195335 | A1* | 8/2007 | Tanaka | G03G 15/5012 358/1.1 |
| 2011/0255099 | A1* | 10/2011 | Harano | G06F 3/1208 358/1.5 |
| 2012/0069367 | A1* | 3/2012 | Iguchi | G03G 15/6544 358/1.13 |

FOREIGN PATENT DOCUMENTS

JP 2013-187571 A 9/2013

* cited by examiner

*Primary Examiner* — Lennin R Rodriguezgonzalez
(74) *Attorney, Agent, or Firm* — Canon U.S.A., Inc. IP Division

(57) ABSTRACT

A method of controlling a communication device includes acquiring attribute information indicating a reference method of post-processing from the printing device. The method is supported by a printing device. A print job is transmitted including: (1) attribute information indicating a type of the post-processing and a position where the post-processing is to be executed; and (2) attribute information indicating a reference method of the post-processing added to the print job, determined based on at least the received reference method of the post-processing, to the printing device when printing using the printing device is to be carried out and performance of the post-processing on a printed matter is set up.

17 Claims, 15 Drawing Sheets

FIG. 7A

```
"Get-Printer-Attributes";
RequestAttributes = (
    {
        "attributes-charset" = "utf-8";
        "attributes-natural-language" = en;
        "printer-uri" = "ipp://xxxx.local.:631/ipp/print";
    }
);
RequestId = 123456;
```

```
ResponseAttributes = (                                              710
    {
        "attributes-charset" = "utf-8";
        "attributes-natural-language" = "ja-jp";
    },
    {
        "charset-configured" = "utf-8";
        "charset-supported" = "utf-8";
        "color-mode-default" = default;
        "color-mode-supported" = (
            default,
            mono,
            color
        );
        "color-supported" = 1;
        "compression-supported" = none;
        "copies-default" = 1;
        "copies-supported" =        {
            lower = 1;
            upper = 9999;
        };
        "document-format-default" = "application/octet-stream";
        "document-format-preferred" = "application/pdf";
    <OMITTED>                                                       711
        "reference-position-supported"= ("paper-basis-finishing-position",
                                        "image-basis-finishing-position");

"finishings" = (
            "staple",
            "staple-top-left",                  712
            "staple-top-right",
            "staple-bottom-left",
            "staple-bottom-right"
            "staple-dual-left",
            "staple-dual-top",
            "staple-dual-right",
            "staple-dual-bottom"
            "punch",
            "punch-dual-left",
            "punch-dual-top",
            "punch-dual-right",
            "punch-dual-bottom");
    })
```

*FIG. 7B*

```
"Create-Job" ;
OperationAttributes =  (
    {
        "attributes-charset" = "utf-8";
        "attributes-natural-language" = en;
        "printer-uri" = "ipp://xxxx.local.:631/ipp/print";
        "requesting-user-name" = "user1"
    }
);
JobAttributes = (
    "output-bin" = "auto"
  <OMITTED>                         ~721
  ┌─────────────────────────────────────────────────┐
  │ "reference-position" = "paper-basis-finishing-position"; │
  │ "finishings" = "punch-dual-left";                │
  └─────────────────────────────────────────────────┘
                                       `722
  <OMITTED>
);
```

*FIG. 7C*

```
"Get-Printer-Attributes";
  <OMITTED>
  ResponseAttributes =  (
    {                                         ~730
    ┌─────────────────────────────────────────────────────────────┐
    │ ··· <OMITTED>                                                │
    │ "reference-position-supported"= ("image-basis-finishing-position"); │
    └─────────────────────────────────────────────────────────────┘
        "finishings" = (
            "staple",
            "staple-top-left", ···
    <OMITTED>
})
```

*FIG. 7D*

```
"Create-Job";

OperationAttributes =  (
        {
        "attributes-charset" = "utf-8";
        "attributes-natural-language" = en;
        "printer-uri" = "ipp://xxxx.local.:631/ipp/print";
        "requesting-user-name" = "user1"
        }
);

JobAttributes = (
      "output-bin" = "auto"
    <OMITTED>                              ~741

"reference-position" = "image-basis-finishing-position";
    "finishings" = "punch-dual-top";
                                           ~742
    <OMITTED>

);
```

FIG. 9
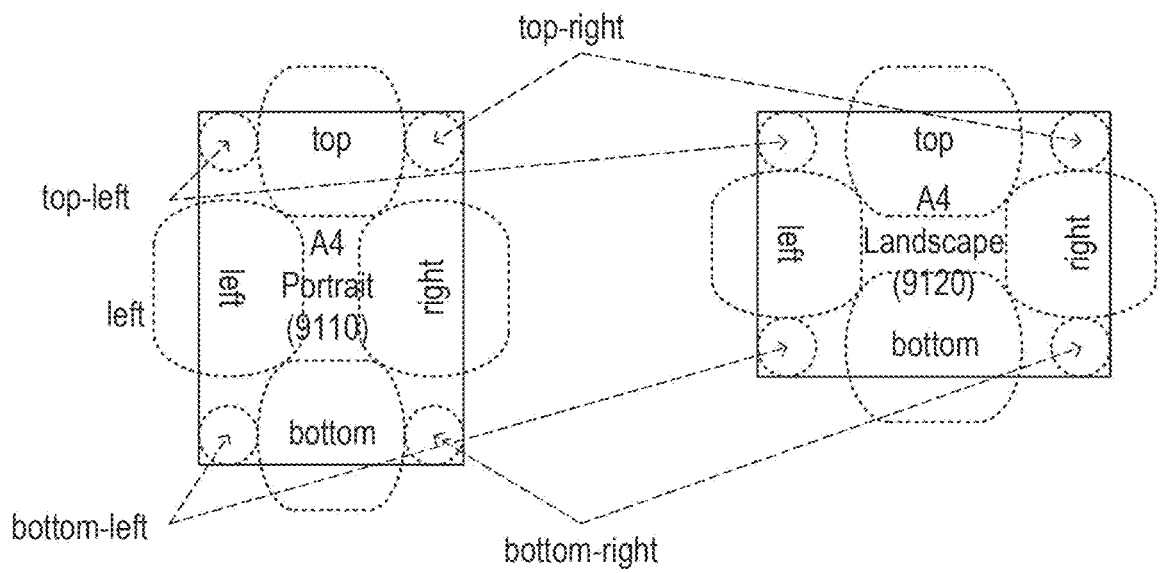
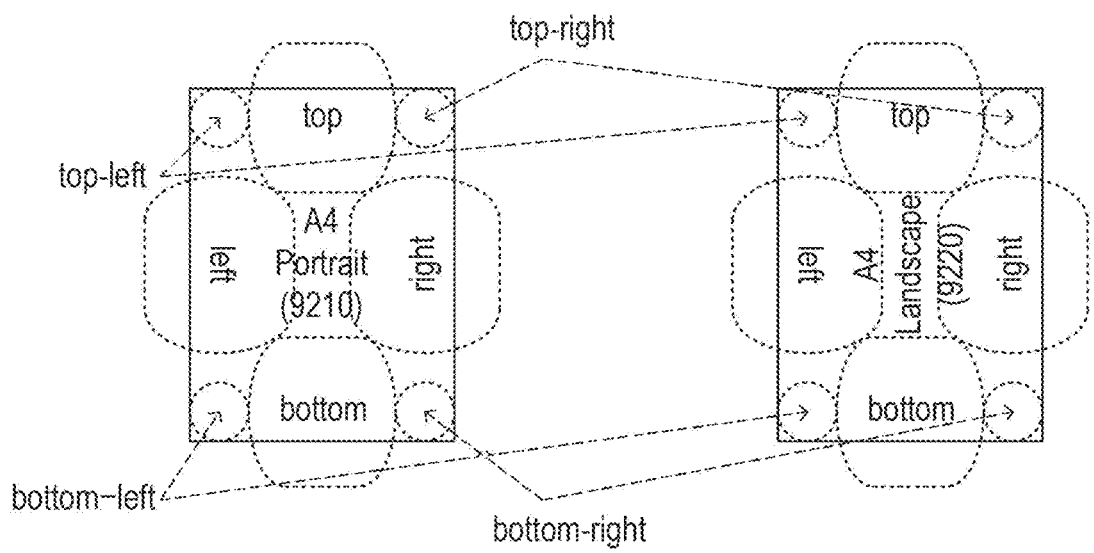

FIG. 11

| REFERENCE METHOD OF PRINTER | POSITION DESIGNATION FOR POST-PROCESSING | INPUT IMAGE | | DESIGNATED POSITION OF PRINT DATA | REMARKS |
|---|---|---|---|---|---|
| | | SIZE | ORIENTATION | | |
| SHEET BASIS | TOP-LEFT | A4 | Portrait | TOP-LEFT | |
| | BOTTOM-LEFT | | | BOTTOM-LEFT | |
| | TOP-RIGHT | | | TOP-RIGHT | |
| | BOTTOM-RIGHT | | | BOTTOM-RIGHT | |
| | TOP | | | TOP | |
| | BOTTOM | | | BOTTOM | |
| | LEFT | | | LEFT | |
| | RIGHT | | | RIGHT | |
| | TOP-LEFT | A4 | Landscape | TOP-LEFT | |
| | BOTTOM-LEFT | | | BOTTOM-LEFT | |
| | TOP-RIGHT | | | TOP-RIGHT | |
| | BOTTOM-RIGHT | | | BOTTOM-RIGHT | |
| | TOP | | | TOP | |
| | BOTTOM | | | BOTTOM | |
| | LEFT | | | LEFT | |
| | RIGHT | | | RIGHT | |
| IMAGE BASIS | TOP-LEFT | A4 | Portrait | TOP-LEFT | |
| | BOTTOM-LEFT | | | BOTTOM-LEFT | |
| | TOP-RIGHT | | | TOP-RIGHT | |
| | BOTTOM-RIGHT | | | BOTTOM-RIGHT | |
| | TOP | | | TOP | |
| | BOTTOM | | | BOTTOM | |
| | LEFT | | | LEFT | |
| | RIGHT | | | RIGHT | |
| | TOP-LEFT | A4 | Landscape | TOP-RIGHT | RIGHT 90 DEGREE ROTATION |
| | BOTTOM-LEFT | | | TOP-LEFT | RIGHT 90 DEGREE ROTATION |
| | TOP-RIGHT | | | BOTTOM-RIGHT | RIGHT 90 DEGREE ROTATION |
| | BOTTOM-RIGHT | | | BOTTOM-LEFT | RIGHT 90 DEGREE ROTATION |
| | TOP | | | RIGHT | RIGHT 90 DEGREE ROTATION |
| | BOTTOM | | | LEFT | RIGHT 90 DEGREE ROTATION |
| | LEFT | | | TOP | RIGHT 90 DEGREE ROTATION |
| | RIGHT | | | BOTTOM | RIGHT 90 DEGREE ROTATION |

| REFERENCE METHOD OF PRINTER | POSITION DESIGNATION FOR POST-PROCESSING | INPUT IMAGE | | DESIGNATED POSITION OF PRINT DATA | REMARKS |
| --- | --- | --- | --- | --- | --- |
| | | SIZE | ORIENTATION | | |
| SHEET BASIS | TOP-LEFT | A4 | Portrait | TOP-LEFT | |
| | BOTTOM-LEFT | | | BOTTOM-LEFT | |
| | TOP-RIGHT | | | TOP-RIGHT | |
| | BOTTOM-RIGHT | | | BOTTOM-RIGHT | |
| | TOP | | | TOP | |
| | BOTTOM | | | BOTTOM | |
| | LEFT | | | LEFT | |
| | RIGHT | | | RIGHT | |
| | TOP-LEFT | A4 | Landscape | BOTTOM-LEFT | LEFT 90 DEGREE ROTATION |
| | BOTTOM-LEFT | | | BOTTOM-RIGHT | LEFT 90 DEGREE ROTATION |
| | TOP-RIGHT | | | TOP-LEFT | LEFT 90 DEGREE ROTATION |
| | BOTTOM-RIGHT | | | TOP-RIGHT | LEFT 90 DEGREE ROTATION |
| | TOP | | | LEFT | LEFT 90 DEGREE ROTATION |
| | BOTTOM | | | RIGHT | LEFT 90 DEGREE ROTATION |
| | LEFT | | | BOTTOM | LEFT 90 DEGREE ROTATION |
| | RIGHT | | | TOP | LEFT 90 DEGREE ROTATION |
| IMAGE BASIS | TOP-LEFT | A4 | Portrait | TOP-LEFT | |
| | BOTTOM-LEFT | | | BOTTOM-LEFT | |
| | TOP-RIGHT | | | TOP-RIGHT | |
| | BOTTOM-RIGHT | | | BOTTOM-RIGHT | |
| | TOP | | | TOP | |
| | BOTTOM | | | BOTTOM | |
| | LEFT | | | LEFT | |
| | RIGHT | | | RIGHT | |
| | TOP-LEFT | A4 | Landscape | TOP-LEFT | |
| | BOTTOM-LEFT | | | BOTTOM-LEFT | |
| | TOP-RIGHT | | | TOP-RIGHT | |
| | BOTTOM-RIGHT | | | BOTTOM-RIGHT | |
| | TOP | | | TOP | |
| | BOTTOM | | | BOTTOM | |
| | LEFT | | | LEFT | |
| | RIGHT | | | RIGHT | |

1301

COMMUNICATION DEVICE, CONTROL METHOD, AND NON-TRANSITORY COMPUTER-READABLE STORAGE MEDIUM FOR PRINT JOB WITH POST-PROCESSING

BACKGROUND OF THE INVENTION

Field of the Invention

One disclosed aspect of the embodiments relates to a communication device for transmitting data to a printing device.

Description of the Related Art

Conventionally, there is known a printing device that receives print data from a communication device via a network and prints an image on a sheet on the basis of the received print data. It is also known to generate print data to be transmitted to a printing device by using a printer driver (or a print application) designed to use individual printing devices.

In recent years, it is known to generate print data without using a printer driver (or print application) designed to use individual printing devices. For example, a method is known for generating print data by a general-purpose print client provided as a function of an operating system (OS) of a communication device and transmitting the print data to the printing device. In such a general-purpose print client, an arrangement for performing printing based on a network protocol (IPP: Internet Printing Protocol) for causing a printing device to execute printing is mounted. The printing process is implemented by communication between the printing device and the communication device according to this protocol.

For example, Japanese Patent Laid-Open No. 2013-187571 discloses that when an image is selected on the screen of the communication device and an instruction of printing is given, nearby printing devices are searched for and a list of the printing devices searched out is displayed. In addition, it is described that a protocol suitable for transmitting image data is selected on the basis of protocol information corresponding to the selected printing device, and image data for printing is transmitted.

There is also known a printing device having a sheet processing unit for performing post-processing such as binding a printed matter, or punching a punch hole in a printed matter. In a printing device having a sheet processing unit, post-processing such as a binding process or a punching process is performed at a position designated by a user.

SUMMARY OF THE INVENTION

A method of controlling a communication device includes acquiring attribute information indicating a reference method of post-processing from the printing device. The method is supported by a printing device. A print job is transmitted including: (1) attribute information indicating a type of the post-processing and a position where the post-processing is to be executed; and (2) attribute information indicating a reference method of the post-processing added to the print job, determined based on at least the received reference method of the post-processing, to the printing device when printing using the printing device is to be carried out and performance of the post-processing on a printed matter is set up.

Further features of the disclosure will become apparent from the following description of exemplary embodiments (with reference to the attached drawings).

BRIEF DESCRIPTION OF THE DRAWINGS

FIGS. 7A to 7D are diagrams showing an example of attribute information and a print job.

FIG. 9 is a diagram for illustrating a reference method.

FIG. 11 is a diagram for illustrating conversion processing.

FIG. 13 is a diagram for illustrating the conversion processing.

DESCRIPTION OF THE EMBODIMENTS

Figure 1:
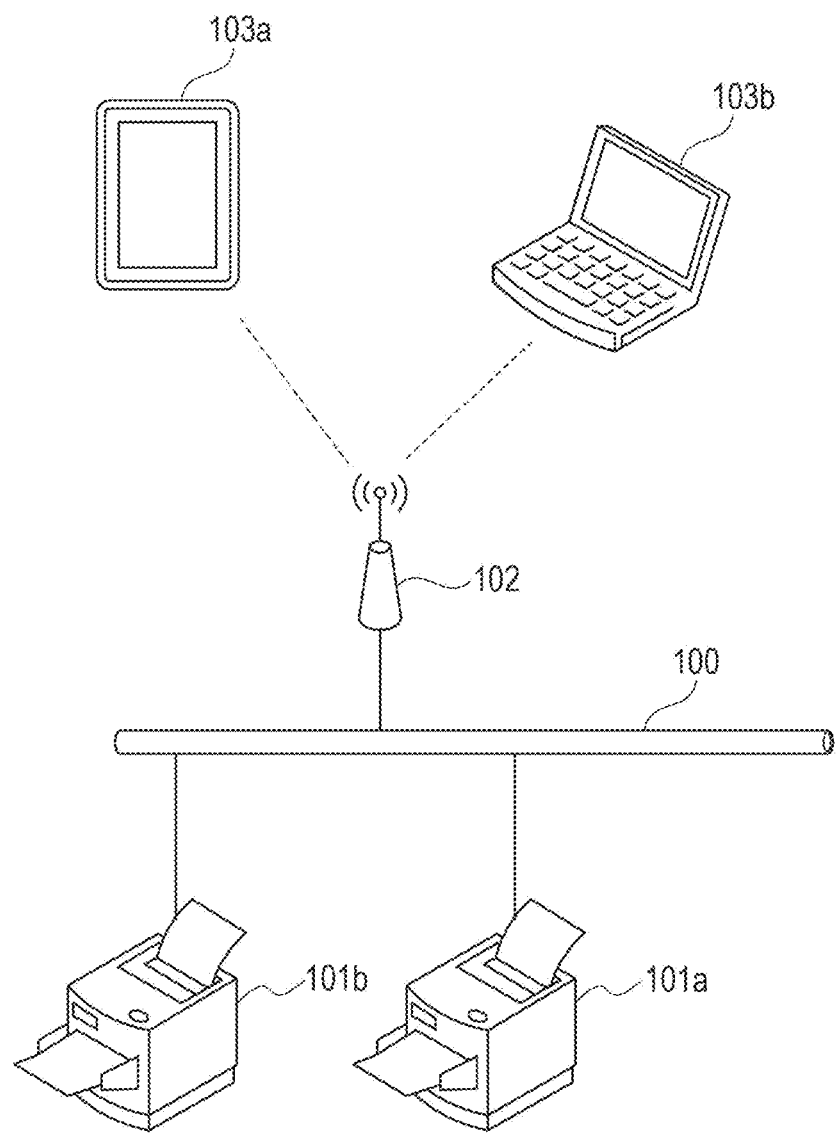
FIG. 1 is a diagram showing an example of a printing system.

In the embodiment according to the disclosure, a case where print data is generated by a general-purpose print service will be described. When print data is generated by a general-purpose print service, print data is generated based on the configuration information of the printing device. Here, in a case where a vendor providing each service and a device vendor providing the printing device are different from each other, print data in which all the attributes required by the printing device are described correctly may not be generated in some cases.

To be specific, the printing device may have a specification different from the specification of the print setting in the general-purpose print client. For example, there are two types of printing devices that are a printing device that interprets position designation of post-processing with reference to the top of a print image and a printing device that interprets position designation of post-processing with reference to a sheet used for printing.

Meanwhile, according to the IPP standard, it is described that the print client specifies the position of the post-processing with reference to the sheet. Therefore, a general-purpose print client conforming to the IPP is created so as to designate the position of post-processing with reference to the sheet.

Here, when a print job in which the position of post-processing has been designated on the basis of the sheet by a general-purpose print client is sent to a printing device which interprets the position designation of post-processing with reference to the top of the print image, the output unintended for user is generated.

Here, it can be thought that improvement is made to make a printing device enable to interpret the post-processing based on the sheet by installing the function of causing the printing device which interprets the designation of the position of the post-processing with reference to the top of the print image to interpret the position designation of post-processing with the sheet as a reference. However, when installing the function in the printing device, there is a problem that the design cost is high because it is necessary to analyze the print job to identify the transmission source, and identify the reference method intended by the transmission source.

Further, it is also conceivable that the print client comprehends all of the reference methods of printing devices and responds to both reference methods. However, in order to switch the reference method according to the device of destination, it is necessary to grasp in advance which method the printing device supports, and the cost for design and maintenance is high.

As one aspect of the embodiment according to the disclosure, the communication device acquires information indicating the supported reference method of post-processing from the printing device so that the print job including the post-processing setting suitable for the printing device can be transmitted, based on the acquired information.

Hereinafter, embodiments for implementing the disclosure will be described with reference to the drawings. It should be noted that the following embodiments do not limit the disclosure according to the claims, and all combinations of features described in the embodiments are not necessarily indispensable for solving means of the disclosure.

First Embodiment

First, the configuration of the printing system will be described with reference to FIG. 1. The printing system according to the present embodiment includes communication devices 103a and 103b, printing devices 101a and 101b, and an access point (AP) 102. On a network 100, the printing devices 101a to 101b and the AP 102 are connected so as to communicate with each other. In the present embodiment, the communication devices 103a to 103b will be described as an example of a communication device. As an example, the case where the communication device 103a is a tablet terminal and the communication device 103b is a personal computer (PC) is shown.

The communication devices 103a and 103b can communicate with the printing device 101 on the network 100 via the AP 102. In the present embodiment, the above configuration is described as an example of a printing system, but the present embodiment is not limited to this. It suffices that at least one communication device and at least one printing device are communicably connected via a network. Communication via the AP 102 is wireless communication conforming to the IEEE 802.11 series, for example. Furthermore, a communication device 103 and the printing device 101 can communicate with each other by direct wireless communication via an ad hoc network such as Wi-Fi Direct (registered trademark) or Wi-Fi Aware (registered trademark). In the present embodiment, it is assumed that print clients conforming to the IPP are installed or pre-installed in the communication devices 103a and 103b. Further, it is assumed that the printing devices 101a and 101b can receive the print job generated by the print client of the communication device 103 to perform a printing process.

Configuration of Printing Device

Figure 2:
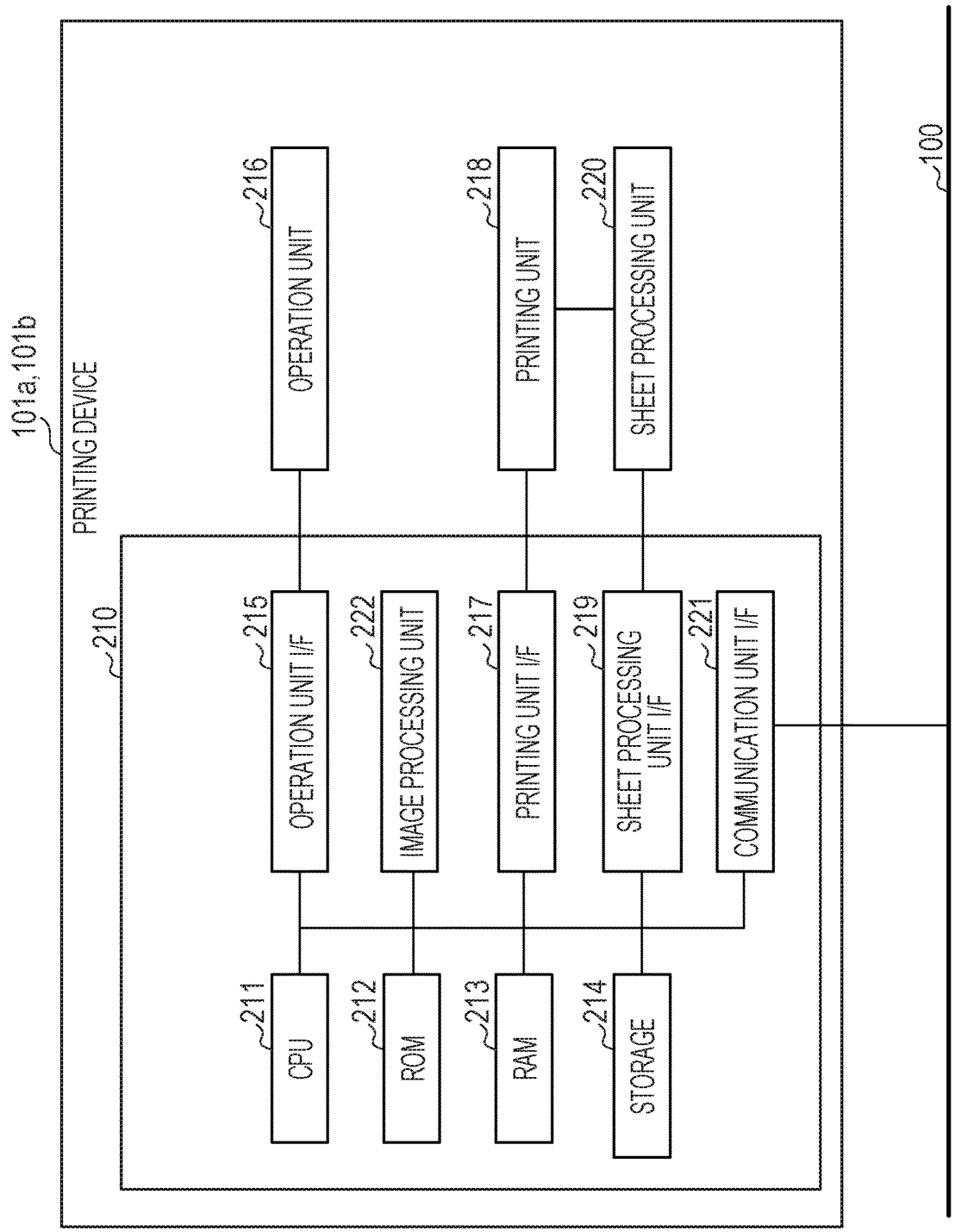
FIG. 2 is a diagram showing an example of a hardware configuration of a printing device.

First, the printing devices 101a to 101b will be described. FIG. 2 is a block diagram showing the hardware configuration of the printing devices 101a and 101b. In the present embodiment, the printing device 101 is exemplified, but the present embodiment is not limited to this device. For example, the device may be an apparatus such as a multifunction peripheral (MFP) having a function of reading a document in addition to the printing function.

A control unit 210 including a central processing unit (CPU) 211 controls the operation of the entire printing device 101. The CPU 211 reads the control program stored in a read only memory (ROM) 212 or a storage 214 and performs various controls such as printing control and reading control. The ROM 212 stores a control program executable by the CPU 211. A random access memory (RAM) 213 is a main storage memory of the CPU 211, and is used as a work area or a temporary storage area for developing various control programs. The storage 214 stores print job data, image data, various programs, and various setting information. In the present embodiment, an auxiliary storage device such as a hard disk drive (HDD) is assumed as the storage 214, but a nonvolatile memory such as a solid state drive (SSD) may be used instead of the HDD. In this manner, the hardware such as the CPU 211, ROM 212, RAM 213, and storage 214 constitutes a so-called computer.

In the printing device 101 according to the present embodiment, one CPU 211 executes respective processes shown in flowcharts to be described later using one memory (RAM 213), but other modes may be employed. For example, respective processes shown in flowcharts to be described later can be executed while a plurality of CPUs, RAMs, ROMs, and storages are made to cooperate with each other. Further, a part of the processing may be executed by using a hardware circuit such as an application specific integrated circuit (ASIC) or field-programmable gate array (FPGA).

An operation unit interface (I/F) 215 connects an operation unit 216 and the control unit 210. The operation unit 216 includes a liquid crystal display unit having a touch panel function and various hard keys, and functions as a display unit for displaying information and a reception unit for receiving instructions from the user.

An image processing unit 222 develops a print job and generates a print image to be used for printing. A printing unit I/F 217 connects a printing unit 218 and the control unit 210. The print image generated by developing the print data by the image processing unit 222 is transferred from the control unit 210 to the printing unit 218 via the printing unit I/F 217. The printing unit 218 receives the control command and the print image via the control unit 210, and prints the image on a sheet fed from a sheet feeding cassette (not shown) based on the received image. Note that the printing method of the printing unit 218 may be an electrophotographic method or an inkjet method. Other printing methods such as a thermal transfer method can also be applied. A sheet processing unit I/F 219 connects the control unit 210 and a sheet processing unit 220. The sheet processing unit 220 receives a control command from the CPU 211 and applies post-processing to the sheet printed by the printing unit 218 according to the control command. For example, post-processing such as aligning a plurality of sheets, punching a hole in a sheet, or binding a plurality of sheets is executed. It is assumed that the printing device 101a according to the present embodiment supports position designation based on the sheet. Further, the printing device 101a can convert the position designation based on the image to the position designation based on the sheet via a converting unit 305 to be described later. The printing device 101a can generate a control command to be transmitted to the sheet processing unit 220 in accordance with the position designation based on the sheet (or converted to the sheet basis) and the capability of the sheet processing unit. Accordingly, both the position designation based on the sheet and the position designation based on the image can be supported.

On the other hand, the printing device 101b of the present embodiment supports only the position designation based on the image. Description is made assuming that the printing device 101b generates a control command to be transmitted to the sheet processing unit 220 on the basis of the position designation based on the image and the capability of the sheet processing unit or the like.

Information about the post-processing function, the binding position designation method, and the post-processing capability of the sheet processing unit 220 is given to the control unit 210 via the sheet processing unit I/F 219 in advance (for example, when the printing device 101 is activated), and stored in the storage 214 or the RAM 213.

Further, the control unit 210 is connected to the network 100 via a communication unit I/F 221. The communication unit I/F 221 transmits the capability information and the status information to the communication device on the network 100, and receives print jobs from the communication device on the network 100.

Incidentally, when performing printing conforming to the internet printing protocol (IPP) specification, print data is generated based on the configuration information of the printing device. Here, when the vendor providing respective services and the device vendor providing the printing device are different, the print data in which all attributes necessary for the printing device are described correctly is not necessarily generated.

For example, the printing device 101b only supports a method of interpreting position designation of post-processing based on the top of a print image. On the other hand, according to the IPP standard, it is clearly stated that the print client specifies the position of the post-processing on the basis of the sheet. Accordingly, a general-purpose print client conforming to the IPP performs position designation of post-processing on the basis of the sheet.

When a print job in which position for post processing has been designated on the basis of the sheet is transmitted by a general-purpose print client to the printing device 101b that interprets position designation of post-processing with reference to the top of the print image, there is a fear that an output object which is not intended by the user may be generated.

In addition, a configuration is also conceivable in which both of the two position designation methods (position designation based on the sheet and position designation based on the image) can be supported like the printing device 101a. However, simply supporting two position designation methods cannot determine which method should be used. In this case, it is troublesome to identify the transmission source from the User-Agent information of the HTTP request of the print job and identify the reference method intended by the transmission source.

Further, although it is conceivable that the print client may correspond to both reference methods, even in this case as well, it is necessary to grasp in advance which method the printing device supports in order to switch the reference method according to a device of destination, and thus time, labor and maintenance costs are required.

In view of the above problem, the communication device 103 according to the present embodiment provides a function of acquiring information indicating the supported reference method of post-processing from the printing device, and transmitting a print job including post-processing setting suitable for the printing device based on the acquired information. A specific implementation method will be described below.

Figure 3:
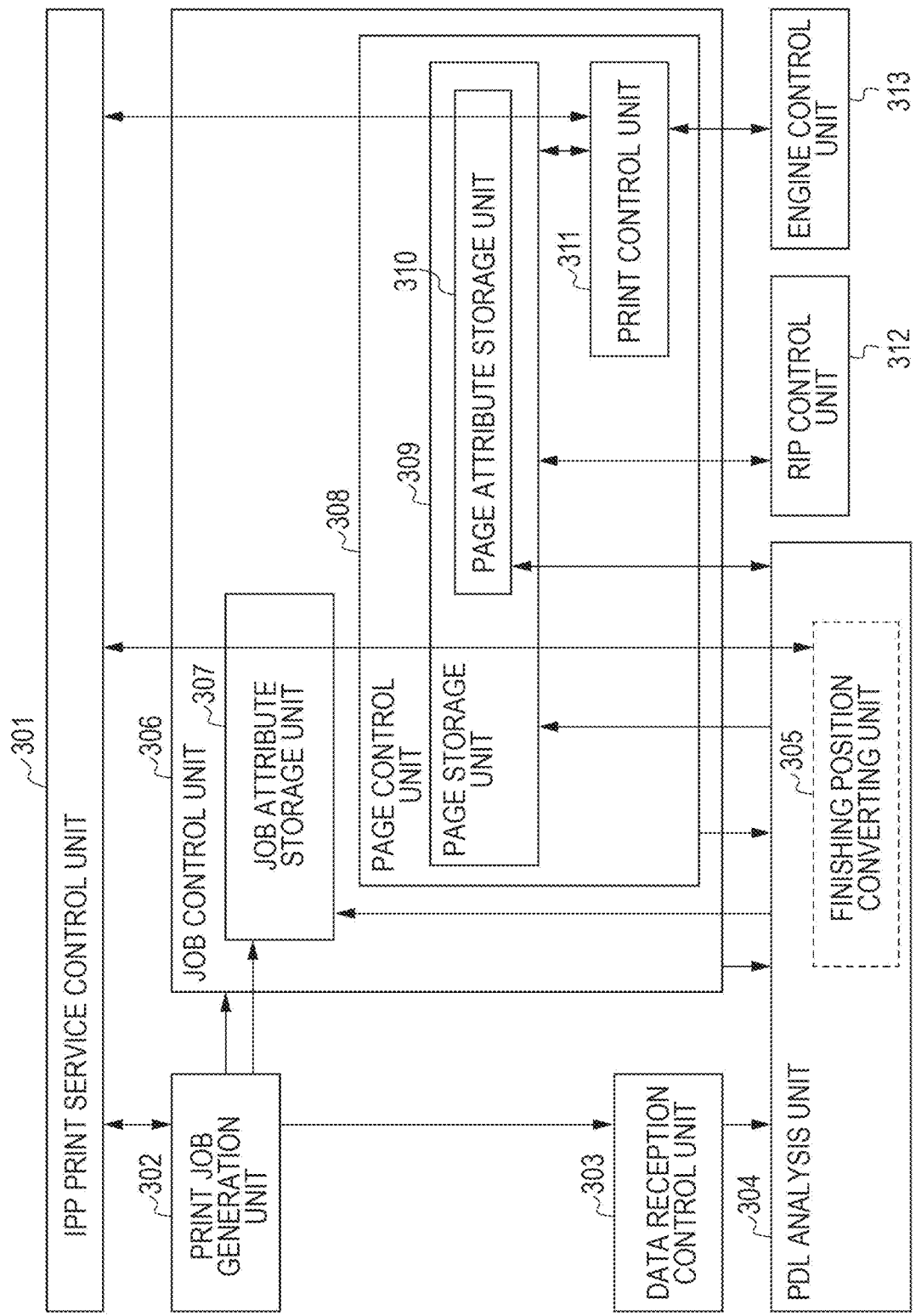
FIG. 3 is a diagram illustrating an example of a software configuration of the printing device.

FIG. 3 shows an example of the software configuration of the printing device 101. Each functional block shown in FIG. 3 is implemented by the CPU 211 executing a program developed in the RAM 213.

An IPP print service control unit 301 acquires the configuration information on the printing device 101 from an engine control unit 313 via a print control unit 311. The configuration information to be acquired includes the reference method of post-processing that can be interpreted by the printing device 101 and information indicating the capability of post-processing. The acquired configuration information is appropriately transmitted to the communication device 103 in response to a request from the communication device 103.

For example, in the case of the printing device 101a, the device is notified that post-processing based on the image and post-processing based on the sheet can be interpreted in addition to about the capability of post-processing. In the case of the printing device 101b, the device is notified that only image post-processing based on the image can be interpreted in addition to about the capability of post-processing.

Next, the processing of the print job will be described. Upon receiving a print job based on the IPP standard from the communication terminal via the network, the IPP print service control unit 301 passes the print job to a print job generation unit 302.

The print job generation unit 302 receives the print job transmitted by the communication terminal via the IPP print service control unit 301, writes the print job in a data reception control unit 303, and at the same time registers the print job as a new job in a job control unit 306, and then requests start of the printing process. Then, the print job generation unit 302 passes the print setting information to be applied to the print job to a job attribute storage unit 307. The data reception control unit 303 is a buffer area of the print job received by the print job generation unit 302. When the job control unit 306 instructs a PDL analysis unit 304 to perform the PDL analysis processing of the print job, the PDL analysis unit 304 requests the print job from the data reception control unit 303. As a result, the data reception control unit 303 transfers the data of the print job to the PDL analysis unit 304. The PDL analysis unit 304 generates intermediate drawing data and page attributes according to the language specification of page description language (PDL), and stores the processing result in a page storage unit 309 and a page attribute storage unit 310. Attributes stored in the job attribute storage unit 307 include "Nup (aggregate print)", "print surface (single-sided/double-sided) setting", "color/monochrome mode", "post-processing setting" and the like set as IPP job attributes such as "number of copies". These attributes are managed in association with the job ID in the job attribute storage unit 307.

In FIG. 3, the position converting unit 305 for post-processing indicated by a broken line has a configuration that the printing device 101a has and the printing device 101b does not have. The printing device 101a is built on the premise that post-processing position is set on the basis of the sheet. The converting unit 305 has a function of converting the post-processing position on the image basis to the post-processing position on the sheet basis in the case where the post-processing position is set on the basis of the image. Therefore, the printing device 101a can correctly interpret both the sheet-based post-processing designation and the image-based post-processing designation. In the present embodiment, the printing device 101a determines which reference method is used for setting the position of the post-processing on the basis of the attribute information indicating the reference method of the post-processing included in the print job transmitted by the communication device 103.

On the other hand, the printing device 101b according to the present embodiment is made on the assumption of position designation based on the image, and furthermore, does not have the configuration of the converting unit 305. Accordingly, although the printing device 101b can correctly interpret post-processing designation based on the image, there is a possibility that the designation of post-processing based on the sheet cannot be correctly interpreted.

The job control unit 306 controls page analysis processing of the PDL analysis unit 304, RIP processing of a RIP control unit 312, and print control processing of the print control unit 311. The print control unit 311 acquires image data having undergone the RIP from the page storage unit 309, subjects the image data to color separation into CMYK, and transfers the data to the engine control unit 313. The engine control unit 313 receives image data separated into CMYK from the print control unit 311 for each page and controls the printing unit 218 to print each page.

Configuration of the Communication Device

Figure 4:
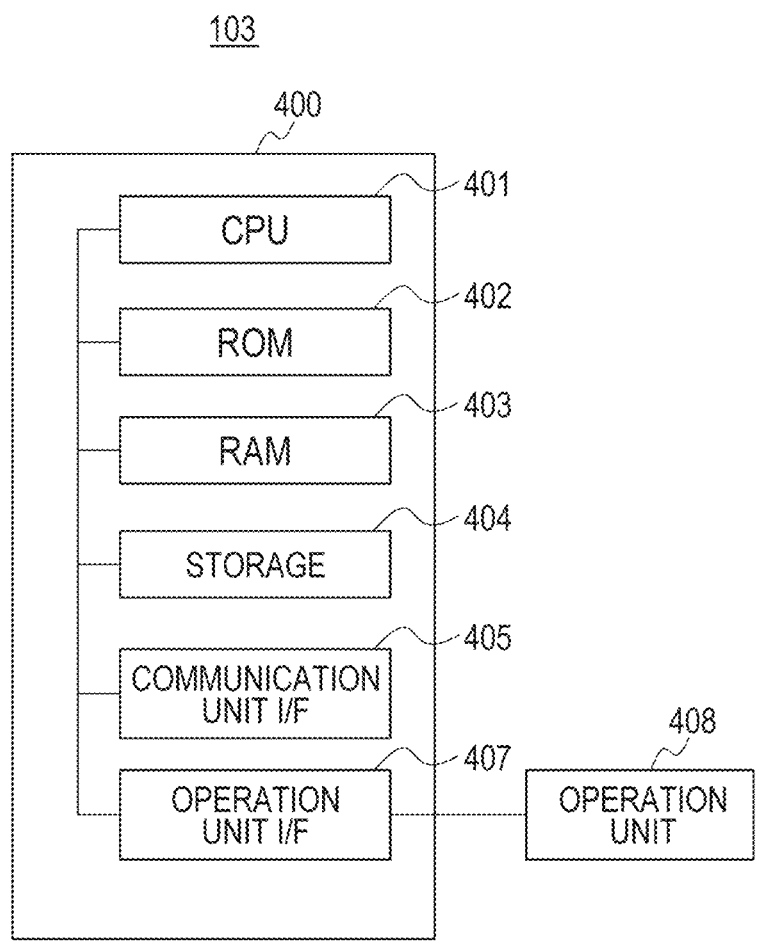
FIG. 4 is a diagram showing an example of a hardware configuration of a communication device.

Next, the configuration of the communication devices 103a to 103b will be described. The communication devices 103a to 103b have a print client conforming to the IPP, and can transmit a print job conforming to the IPP to the printing device 101. FIG. 4 is a diagram for illustrating an example of the hardware configuration of the communication devices 103a to 103b. A control unit 400 including a CPU 401 controls the overall operation of the communication device 103. The CPU 401 develops the program stored in a ROM 402 or a storage 404 in a RAM 403, and executes the program to perform various controls such as control of a print setting screen, generation of print data, and transfer of a print job. The ROM 402 stores control programs, boot programs, etc. that can be executed by the CPU 401. The RAM 403 is a main storage memory of the CPU 401 and is used as a work area or a temporary storage area for developing various programs. The storage 404 stores an OS, an application, an OS print framework, a print job generated by the OS print framework, and various setting information. In this way, the hardware such as the CPU 401, ROM 402, RAM 403, and storage 404 constitutes a so-called computer. A communication unit I/F 405 is a network interface capable of exchanging data with a printing device on the network 100.

An operation unit 408 is connected to an operation unit I/F 407. The operation unit 408 is composed of a display unit that displays screens for respective applications and print setting screens, and a touch panel that functions as a reception unit that accepts user operations.

Figure 5:
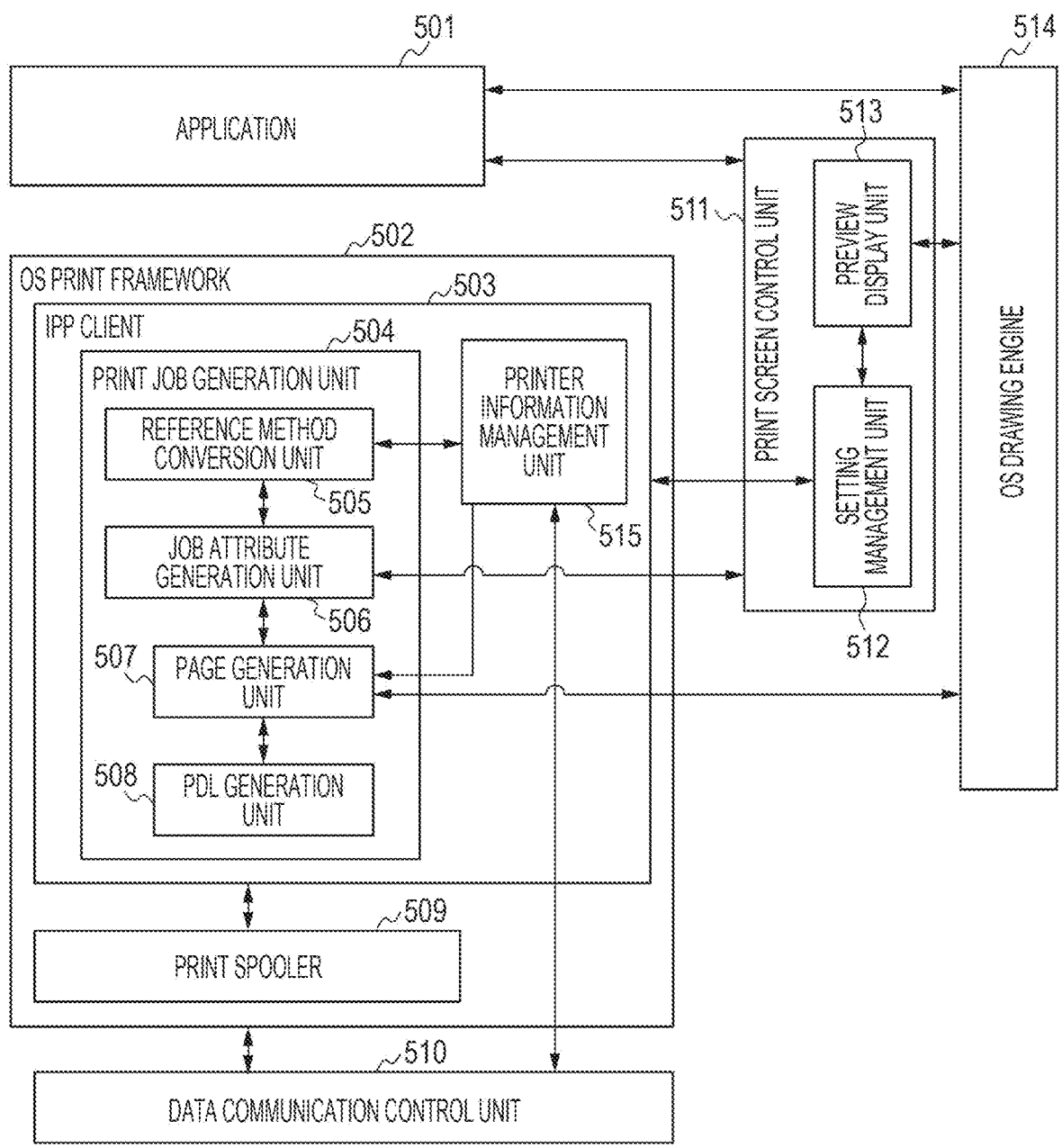
FIG. 5 is a diagram showing an example of a software configuration of the communication device.

Subsequently, an example of the software configuration of the communication devices 103a and 103b according to the present embodiment will be described with reference to FIG. 5. It is assumed that each functional block shown in FIG. 5 is achieved by the CPU 401 executing a program developed in the RAM 403.

An application 501 may be any application installed by the user in the communication device, and is a general application such as a word processor, spreadsheet, mail, or web browser. When the user calls the print function on the application 501, the application 501 calls a print screen control unit 511. Further, the application 501 transfers the content to be printed to an OS drawing engine 514. The OS drawing engine 514 converts the content to be printed into a drawing format of the OS standard in accordance with an instruction from the application 501. The page data converted into the OS standard drawing format is passed to a page generation unit 507 of a print job generation unit 504. In addition, the OS drawing engine 514 generates an image for page preview to be displayed on the operation unit 408, and passes the generated image to a preview display unit 513.

The print screen control unit 511 displays a screen for performing print setting and preview before printing in cooperation with the preview display unit 513.

A setting management unit 512 manages default settings, print settings currently being set, and the like. The setting screen and the setting items displayed by the print screen control unit 511 are customized appropriately so that the settings suitable for the printing device can be made on the basis of the attribute information of the printing device stored in a printer information management unit 515 and the default setting stored in the setting management unit 512. Therefore, a UI screen for print setting according to the capability of each printing device can be displayed. Further, in the present embodiment, it is assumed that whether to display the UI of the print setting on the sheet basis or to display the UI of the print setting on the image basis can be changed according to the capability of the printing device. Also, the preview display method can be made different according to the capability of the printing device (details will be described later). However, an IPP client 503 according to the present embodiment and the print screen control unit 511 provided by the OS are built on the premise that post-processing is performed on the basis of the sheet. Therefore, the setting management unit 512 manages the setting regarding the position where post-processing should be executed with the sheet as a reference.

An OS print framework 502 is composed of the IPP client 503 and a print spooler 509. The IPP client 503 includes a print job generation unit 504 for generating a print job on the basis of an instruction from the print screen control unit 511 and the printer information management unit 515 for holding the capability information of the printing device acquired from the printing device 101. The print spooler 509 sequentially transfers the print jobs generated by the IPP client 503 to the printing device via a data communication control unit 510.

The printer information management unit 515 acquires printer attribute information from the printing device 101 through the data communication control unit 510. Also, the acquired attribute information is provided as appropriate to the print screen control unit 511 or a reference method conversion unit 505.

A job attribute generation unit 506 and the page generation unit 507 receive an instruction to generate a print data from the print screen control unit 511 and start processing. The job attribute generation unit 506 generates job setting information of the IPP job in accordance with an instruction from the print setting management unit 512. The page generation unit 507 acquires the page data generated by the OS drawing engine 514 in the order of page, converts the data into a PDL language processable by the printing device 101 in cooperation with a PDL generation unit 508, and transmits the data to the page spooler. Note that the PDL format that the printing device 101 can understand is acquired from the printer information management unit 515.

Further, the page generation unit 507 acquires also the reference method of post-processing supported by the printing device from the printer information management unit 515. As described above, in the present embodiment, the setting related to the position where post-processing is to be executed is managed with the sheet as a reference. In view of this, when sending a job to a printing device that desires post-processing of the image basis, the job attribute generation unit 506 requests the reference method conversion unit 505 to convert setting information.

Printing Process

Figure 6:
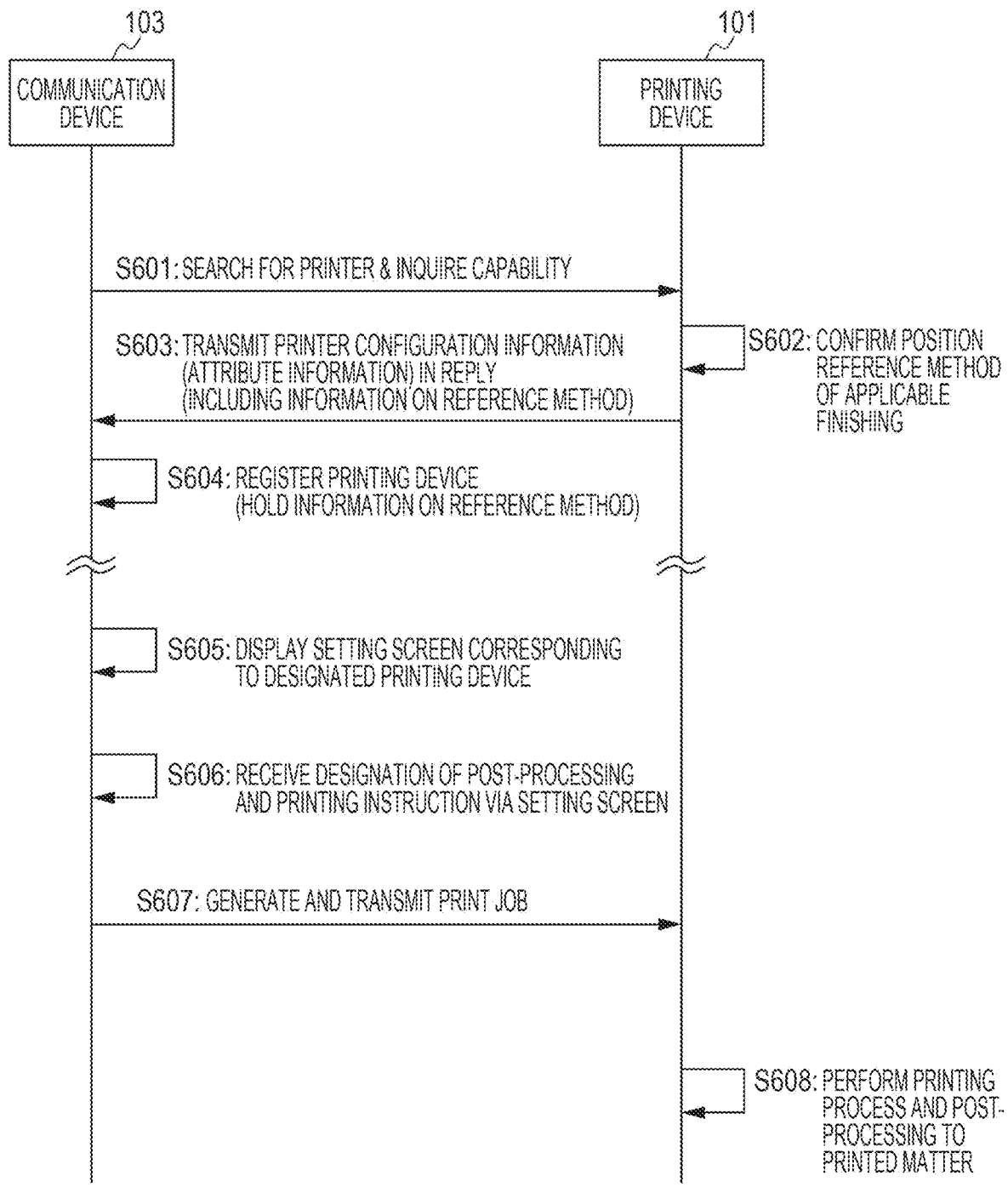
FIG. 6 is a sequence diagram illustrating an example of a processing procedure in the printing system.

Subsequently, the printing process in the printing system will be described with reference to FIGS. 6 to 7. FIG. 6 is a sequence diagram showing the printing process in the printing system of the present embodiment. The communication device 103 searches for a printing device and inquires the capability of the printing device in step S 601.

In step S602, the printing device 101 confirms the designation method of the position of the applicable post-processing, and in step S603, the communication terminal is notified about the configuration information of the printer including the position reference method of the applicable post-processing (also referred to as attribute information of the printing device). Incidentally, the attribute information also includes the capability of post-processing and the capabilities of other printers.

FIGS. 7A to 7D are diagrams for illustrating the notification of the attribute information and the printing attributes added to the print job. FIG. 7A is a diagram illustrating an example of attribute information of a printing device transmitted by the printing device 101a and FIG. 7C is a diagram illustrating an example of attribute information of a printing device transmitted by the printing device 101b. The information 710 in FIG. 7A is attribute information indicating the capability and the like supported by the printing device. The information 710 includes information 711 indicating the reference position of post-processing and information 712 indicating the type and position of post-processing supported by the printing device. The information 711 is information indicating that the reference method of post-processing that the printing device 101a can support has both the sheet basis and the image basis methods. In the present embodiment, for example, the attribute name is assumed to be "reference-position-supported". Further, as an example, a case where the attribute value that can be set in association with this attribute name is "image-basis-finishing-position" or "sheet-basis-finishing-position" is illustrated. However, attribute names and attribute values that can be set are not limited to these examples.

In addition, the information 712 is capability information of post-processing possessed by the printing device 101a. It is shown that one or two staples can be applied at any one of four corners or the top, bottom, left, or right, and as the position designation method for punching, two holes can be set at any one of four places of the top, bottom, left, and right.

On the other hand, FIG. 7C shows an example of attribute information of the printing device transmitted by the printing device 101b. The same description as in FIG. 7A is omitted, and only the difference is shown. The information 730 is information indicating a reference method of post-processing that the printing device 101b can support. Since the printing device 101b according to the present embodiment only supports interpretation of post-processing of the image basis, the printing device 101b notifies that the supportable reference method of post-processing is only the image basis method.

Returning to the description of FIG. 6, the communication device 103 receives the sent attribute information of the printing device and stores the information in the printer information management unit 515 in step S604. Next, when the user calls up the printing function from the application on the communication terminal, the setting screen corresponding to the selected printing device is displayed in S605. The user can make settings while appropriately referring to the print preview displayed on the displayed setting screen in S605. The communication device 103 detects the user operation and accepts post-processing settings and other settings in step S606. Further, when detecting the user operation of starting printing, the communication device 103 generates a print job and transmits the print job to the printing device in S607. In addition, the communication device 103 determines the reference method of post-processing to be added to the print job on the basis of the attribute information of the print setting registered in S604. When the reference method of post-processing to be added to the print job is set to be the sheet basis, the communication device 103 converts attribute information indicating the type of post-processing and the position where post-processing should be executed, as necessary when generating a print job.

Figure 8A:
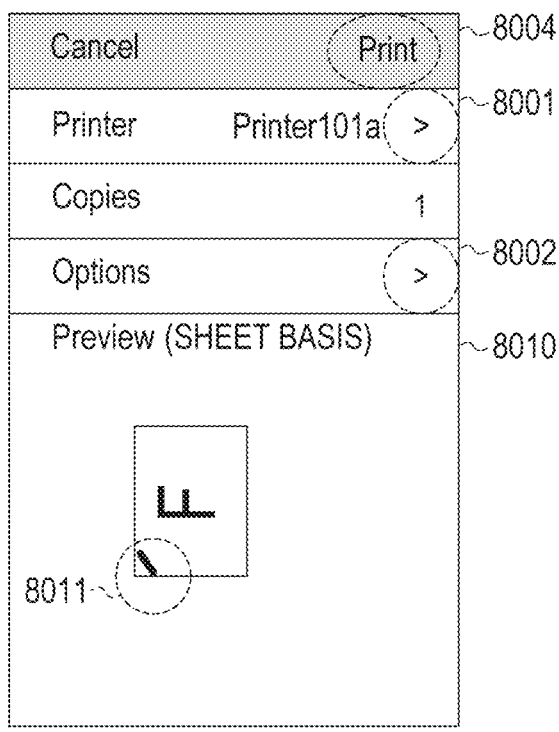
FIGS. 8A to 8D are diagrams showing an example of an operation screen displayed on an operation unit of the communication device.

Next, the screen at the time of print setting to be provided to the user in the sequence of S605 to S607 will be described with reference to FIGS. 8A to 8D. FIGS. 8A to 8D show an example of a setting screen displayed on the operation unit of the communication device 103a. When the print function is called from the application 501, the setting screen shown in FIGS. 8A to 8D is displayed by the print screen control unit 511 provided by the OS. FIG. 8A shows an example of a setting screen, and here, for the sake of description, the printing device 101a is selected as the printing device of destination, and the case where setting is made to apply a staple at the bottom-left of the A4 sheet is illustrated. Also, the case where the content to be printed is portrait is exemplified.

The print screen control unit 511 can change the display UI related to post-processing on the basis of the attribute information of the selected printing device. For example, the printing device 101a supports both the sheet basis and image basis as exemplified in the information 711 in FIG. 7A. In addition, since the sheet basis are listed first as an attribute value, the display UI conforming to the sheet basis is displayed. Reference numeral 8010 denotes a preview area making display in cooperation with the preview display unit 513, and the preview is also displayed in accordance with the sheet basis. Here, a vertically long preview image is displayed whether the content to be printed is portrait or landscape. Reference numeral 8011 denotes an output image of a staple superimposed on a preview image.

The advantage of vertically long display will be described with reference to FIG. 9. FIG. 9 is a diagram for illustrating the difference between the sheet basis method and the image basis method. What is shown in 9200 is a sheet basis method. As described above, the IPP adopts post-processing position based on the sheet. Also, in the IPP, printing on vertically long sheets is a basis manner. Accordingly, in the case of the landscape content, the drawing data corresponding to the content is rotated and transmitted so as to match the vertically long sheet. Therefore, in the present embodiment, control is executed so that a preview display indicating designation of post-processing and the position of the post-processing is also displayed on the basis of the sheet. Further, in the printer driver developed for the printing device which mainly supports the sheet basis method, a UI for setting post-processing on the basis of the sheet is provided. In view of this, in the present embodiment, control is performed so as to display the UI on the basis of the sheet so that the position of post-processing can be specified with a feeling of operation similar to a dedicated printer driver.

Returning to the description of FIGS. 8A to 8D, a key 8002 is a key used for performing detailed print setting. When detecting that the key 8002 is selected, the print screen control unit 511 displays a screen exemplified in FIG. 8C on the operation unit 408. The setting item 8301 is a setting item for setting the binding process. The setting item 8302 is a setting item for setting the punching process. Here, setting relating to post-processing will be described by taking the binding process as an example. When it is detected that the setting item 8301 is selected, the print screen control unit 511 displays the selection screen of FIG. 8D. On the selection screen, the binding position to bind the printed matter can be set on the basis of the information 712 exemplified in FIG. 7A.

A key 8004 is used to start printing. Upon detecting the user operation of selecting the key 8004, the communication device 103 generates a print job on the basis of the setting made on the setting screen and transmits the print job to the selected printing device.

A key 8001 is used to switch the transmission destination of the print job to a different printing device. Upon detecting selection of the key 8001, the screen control unit 511 displays a search screen of printers (not shown). The user can switch the destination printer by the list displayed on the search screen.

Here, the case where the printer of the transmission destination is switched to the printing device 101b will be described as an example. Upon detecting an operation to switch the destination printer to the printing device 101b, the screen control unit 511 displays the screen shown in FIG. 8B. The printing device 101a supports only the image basis as exemplified in the information 730 of FIG. 7C. Accordingly, the communication device 103 performs a process of switching the UI display indicating the preview image and the post-processing setting to the image basis. In the preview area 8210, a preview image is displayed so that the top of the image indicating the content to be printed is on the upper side. Reference numeral 8211 denotes an output image of the staple superimposed on the preview image of the image basis. Also on the screen displayed instead of FIG. 8C, the display on the UI is switched to "top-left".

The image basis method will be described with reference to FIG. 9. Reference numeral 9100 denotes a schematic diagram for illustrating post-processing of the image basis method. In the image basis method, where post-processing is to be performed is specified on the top, bottom, left, and right with reference to the orientation of the print image. Accordingly, the position of "top" in the image is "top" of the finishing position.

Incidentally, in the printer driver developed for the printing device which is made so as to perform post-processing by the image basis method, a UI for setting post-processing based on the top of the image is provided. For example, in the case of portrait content, a vertically long preview image such as 9110 is displayed, and in the case of landscape content, a horizontally long preview image such as 9120 is displayed.

Figure 8B:
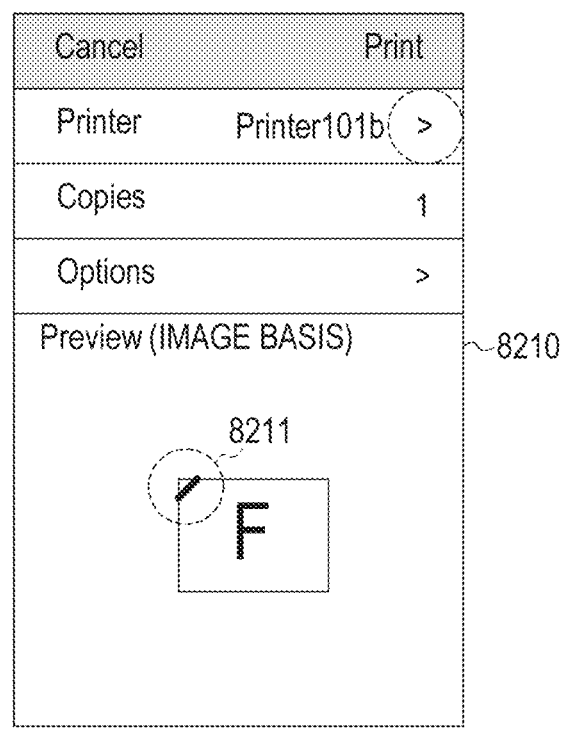
Figure 8C:
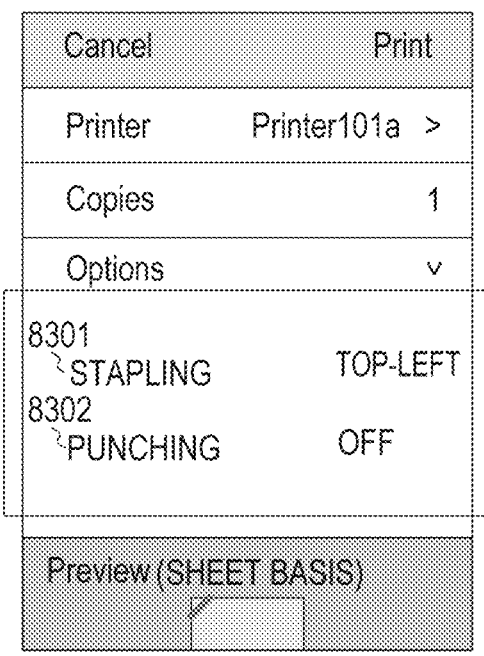
Figure 8D:
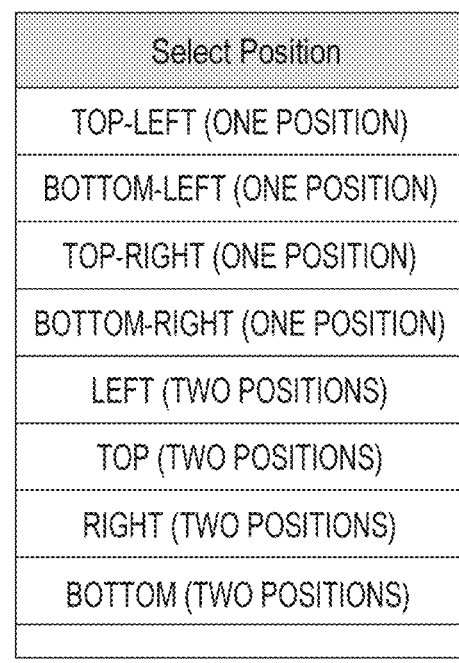

In view of this, in the present embodiment, control is performed so as to display the UI on the basis of the image so that the post-processing position can be specified with a feeling of operation similar to a dedicated printer driver designed for printing devices of the image basis method. By this control, as shown in FIGS. 8A and 8B, the UI display method can be made different according to the method of notifying the printing device of destination. Therefore, post-processing can be designated with a feeling of operation similar to that of a printer driver developed for the printing device of destination.

Returning to the description of FIG. 6, upon receiving the print job transmitted in S607, the printing device 101 executes printing process and post-processing based on the received print job in S608. In the print data transmitted in S607, post-processing is designated by the reference method supported by the printing device 101 having transmitted notification in S603, and the reference method of post-processing is clearly indicated. FIG. 7B shows an example of a print job to be transmitted to the printing device 101a which gives priority to supporting the sheet basis, and exemplifies attribute information of a print job for performing punching process at two places above a landscape content. Attribute information indicating that post-processing is indicated on the sheet basis is given to the information 721. In addition, attribute information indicating the type and position of post-processing is given to the information 722. Here, a case where attribute information prepared by intending to perform a punching process at two places on the left side of a sheet on the sheet basis is given is exemplified.

FIG. 7D is an example of a print job to be transmitted to the printing device 101b that supports the image basis preferentially, and illustrates a print job that performs a punching process at two places above a landscape content.

Attribute information indicating that post-processing is indicated on the image basis is added to the information 741. Attribute information indicating the type and position of post-processing is added to the information 742. Here, a case where a punching process is set at two places on the upper side of the image on the image basis is exemplified.

As described above, when the reference method desired by the printing device of destination is the sheet basis method, the print client executes a processing of converting attribute information indicating the type and position of post-processing managed on the basis of the sheet to the position based on the image. A specific example of the conversion process will be described with reference to the flowchart of FIG. 10. Note that FIG. 10 is a flowchart executed when post-processing is set as a setting related to printing and a print instruction is accepted via the screen illustrated in FIGS. 8A to 8D.

Figure 10:
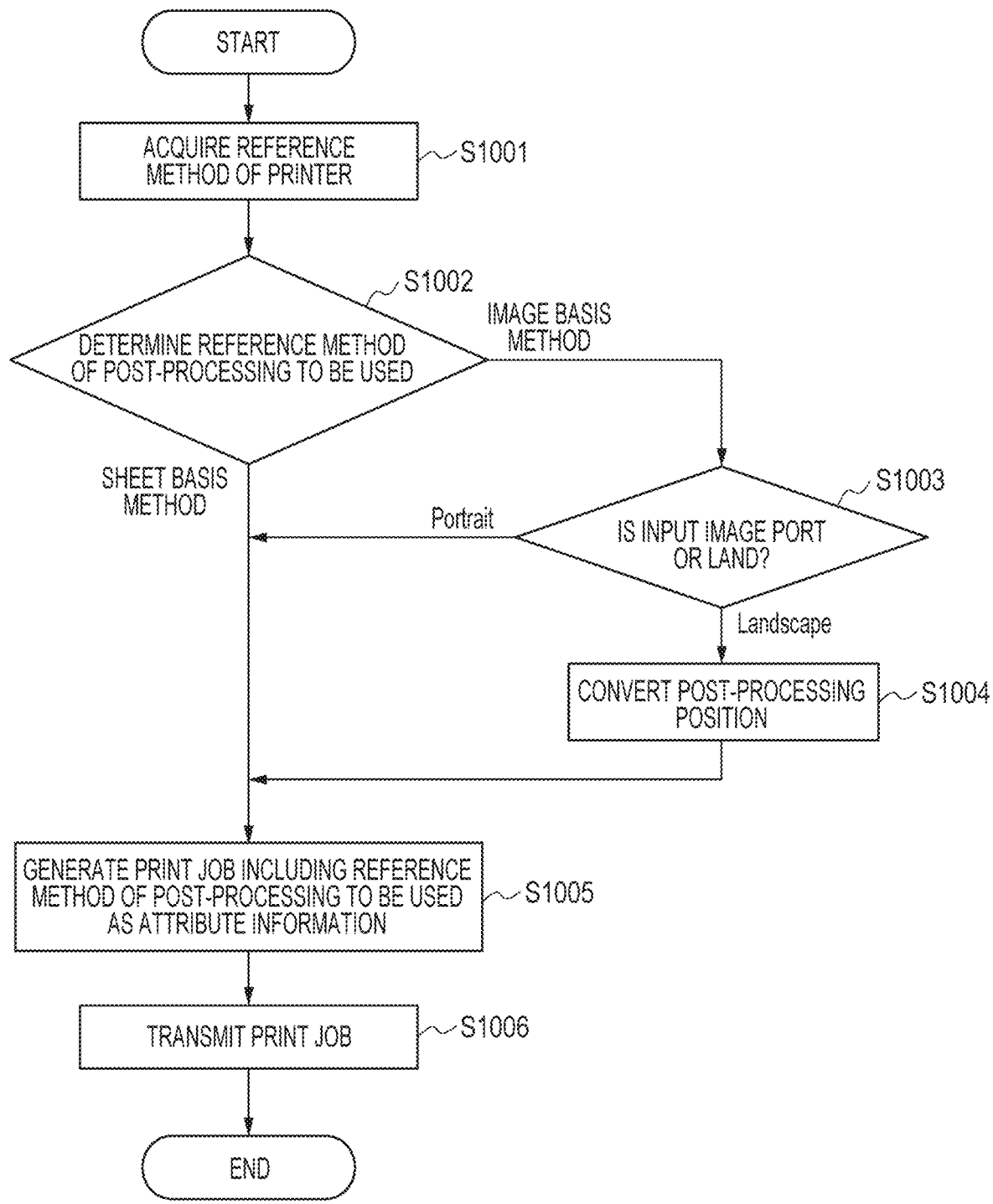
FIG. 10 is a flowchart illustrating an example of control of the communication device.

Each operation (step) shown in the flowchart in FIG. 10 is accomplished by the CPU 401 reading a program for implementing each control module stored in the ROM 402 or the storage 404 and sending the program to the RAM 403 to execute the program. Each processing shown in the flowchart is implemented by the CPU 401 executing a program for achieving the control module described in FIG. 5. In describing the control provided by each control module, description will be made by using the control module achieved by the CPU 401 as the subject. In addition, some processing is implemented with the cooperation of the control module achieved by the CPU 401 and each unit such as the communication unit I/F 405.

In S1001, the job attribute generation unit 506 acquires the reference method of post-processing supported by the printing device of destination from the printer information management unit 515, in cooperation with the page generation unit 507.

Subsequently, the job attribute generation unit 506 determines the reference method of post-processing to be used, in S1002. In the case where there is only one type of post-processing reference method supported by the printing device of destination and acquired in S1001, adoption of this reference method is determined. In the case where there are plural kinds of reference methods of post-processing supported by the printing device of destination and acquired in S1001, it is decided to adopt the first enumerated reference method. For example, when the printing device of destination is the printing device 101a, the sheet basis method listed earlier is determined to be used, and when the printing device of destination is the printing device 101b, the image basis method is determined to be used.

When it is decided to use the image basis method, the processing proceeds to S1003, and when it is decided to use the sheet basis method, the processing proceeds to S1005.

In S1003, the job attribute generation unit 506 determines whether the content data corresponding to the first page is for a portrait or landscape, in cooperation with the page generation unit 507. When the content data is determined to be for a portrait, the processing proceeds to S1005, and when the content data is determined to be for a landscape, the processing proceeds to S1004. The process of S1003 is a process for omitting the conversion process. In the case of the portrait image exemplified in 9110 and 9210 in FIG. 9, even when adopting the sheet basis method or adopting the image basis method, the attribute information indicating the type and position of the post-processing to be added is the same. Consequently, the conversion process can be omitted.

In S1004, the job attribute generation unit 506 performs the conversion process of the attribute information on post-processing in cooperation with the reference method conversion unit 505. The conversion process will be described with reference to FIG. 11. The conversion process is required when the sheet basis method is converted to the image basis method and the input image (the content to be printed) is a landscape. In the present embodiment, it is assumed that post-processing position conversion is performed based on the correspondence information for position conversion as shown in the information 1101. For example, the case of "punch-dual-left" which is a post-processing for opening two punch holes on the left side on the sheet basis will be described as an example. The position "left" in the sheet basis format needs to be converted to "top" in the image basis format. Therefore, "punch-dual-left" is converted to "punch-dual-top". The reference method conversion unit 505 stores in advance the data structure representing the correspondence information corresponding to the information 1101 and implements the conversion process by referring to the correspondence information. In the present embodiment, the case where the position designation of post-processing is derived from the character string indicating the post-processing attribute information before the conversion, and the position designation of post-processing to be added to the print data is derived on the basis of the position designation and the type of post-processing before the conversion is shown by way of example, but the present embodiment is not limited to this case. For example, a data structure in which a character string of attribute information before conversion is associated with a character string of attribute information to be converted may be stored, and the conversion process may be performed with reference to this data structure.

Returning to the description of FIG. 10, the print job generation unit 504 cooperates with units 506 to 508 to generate a print job including the reference method of post-processing determined in S1002 as attribute information, in S1005. Incidentally, the print job includes attribute information indicating the type and position of post-processing, PDL data to be used for printing, and the like.

In S1006, the communication device 103 transmits the print job generated in S1005 to the printing device of destination, and ends the series of processes.

As described above, in the present embodiment, an arrangement in which the communication device 103 acquires information indicating the supported reference method of post-processing from the printing device, and transmits a print job including post-processing settings suitable for the printing device on the basis of the acquired information can be provided.

Modification Example

In the first embodiment, the case where the print client is built so as to manage post-processing on the basis of the sheet has been exemplified. In the second embodiment, a description will be given of a method of transmitting a print job including a post-processing setting suitable for the printing device in a case where the print client is built so as to manage the post-processing on the basis of the image, as a modification example.

In the modification example, the prerequisite hardware configuration is the same as that of the first embodiment, so that the description is omitted. The modification example is different from the first embodiment in that the IPP client 503 and the print screen control unit 511 of the OS are built on the assumption of the image basis. Therefore, it is necessary to convert the attribute information indicating the type and position of the post-processing set on the image basis to the sheet basis.

Figure 12:
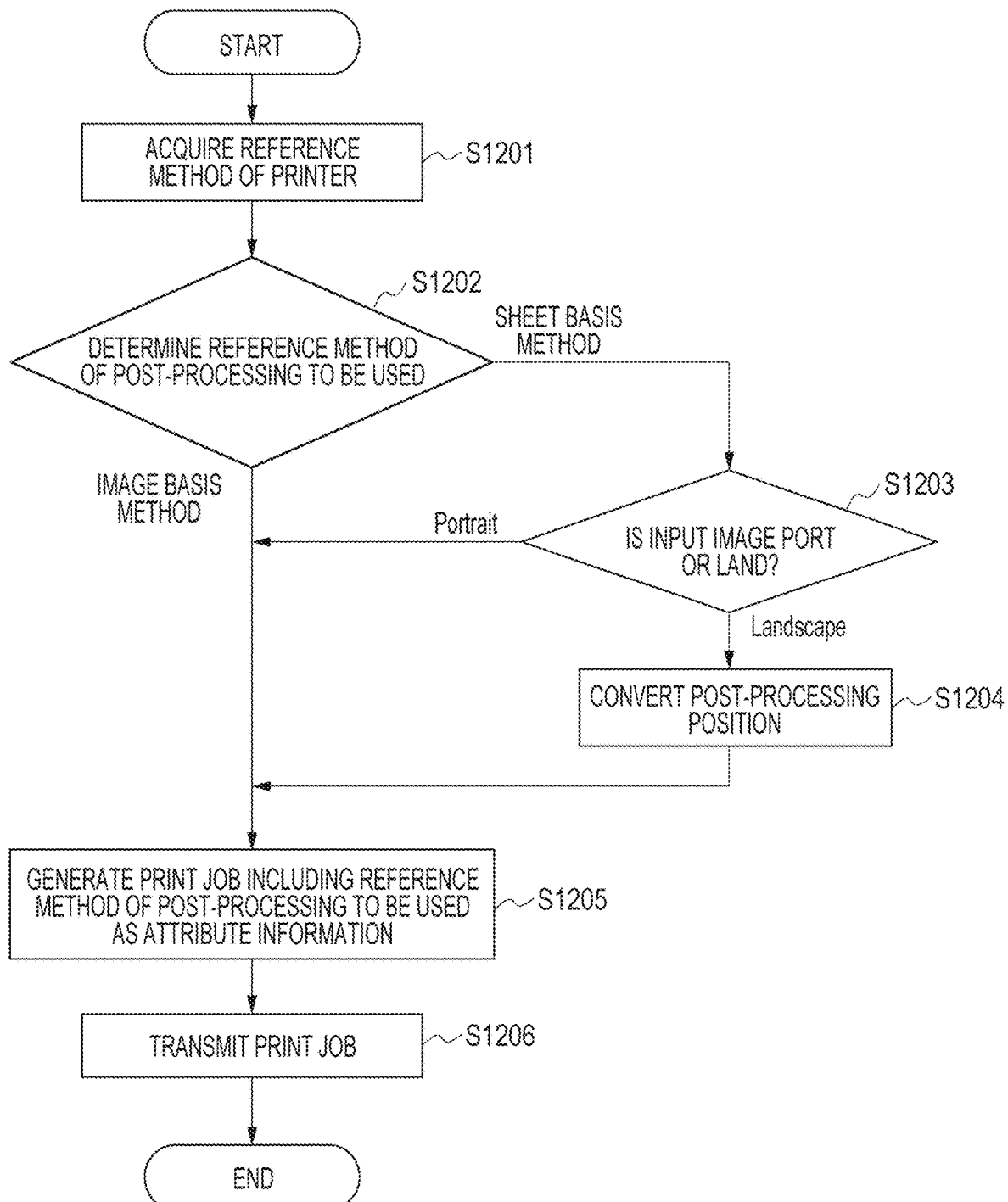
FIG. 12 is a flowchart illustrating an example of control of the communication device.

FIG. 12 shows processing executed in place of the flowchart in FIG. 10 described in the first embodiment.

Step S1201, the communication device 103 acquires the reference method of post-processing supported by a printing device of destination. This processing is similar to S1001, so that its details are omitted.

In S1202, the job attribute generation unit 506 determines the reference method of post-processing to be used. The method of determining is the same as that in S1002 and therefore the description will be omitted. When it is decided to use the sheet basis method, the processing proceeds to S1203, and when it is decided to use the image basis method, the processing proceeds to S1205.

In step S1203, the job attribute generation unit 506 cooperates with the page generation unit 507 to determine whether the content data corresponding to the first page is for a portrait or landscape. When the data is determined to be for a portrait, the processing proceeds to S1205, and when the data is determined to be for a landscape, the processing proceeds to S1204.

In S1204, the job attribute generation unit 506 performs the conversion process of attribute information on post-processing in cooperation with the reference method conversion unit 505. The conversion process will be described with reference to FIG. 13. In this modification example, the conversion process is necessary when the image basis method is converted to the sheet basis method, and when the input image (content to be printed) is a landscape. In the present modification example, it is assumed that post-processing position conversion is performed based on correspondence information for position conversion exemplified as information 1301. For example, a case of performing "punch-dual-top" which is a post-processing for opening two punch holes on the upper side on the image basis will be described. The position "top" in which the top of the landscape is used as the reference in the image basis format needs to be converted to "left" in the sheet basis format. Accordingly, "punch-dual-top" is converted to "punch-dual-left". The reference method conversion unit 505 stores in advance the data structure representing the correspondence information corresponding to the information 1301, and implements the conversion process by referring to the correspondence information. In the present embodiment, the case where the position designation of post-processing is derived from the character string indicating the post-processing attribute information before the conversion, and the position designation of post-processing to be added to the print data is derived on the basis of the position designation and the type of post-processing before the conversion is shown by way of example, but the present embodiment is not limited to this case. For example, a data structure in which a character string of attribute information before conversion is associated with a character string of attribute information to be converted may be stored, and the conversion process may be performed with reference to this data structure. The processing of S1205 to S1206 is the same as that of S1005 to S1006 in the first embodiment and therefore the description will be omitted.

According to one aspect of the embodiment described above, it becomes possible to transmit a print job including a post-processing setting suitable for the printing device on the basis of information indicating the supported reference method of post-processing acquired from the printing device. Accordingly, in a printing system including a communication terminal having a general-purpose print client and a printing device, output of an output object not intended by the user can be minimized while suppressing the cost of the design and maintenance.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-077925, filed Apr. 13, 2018, which is hereby incorporated by reference herein in its entirety.

What is claimed is:

1. A non-transitory computer-readable storage medium storing a program for causing a computer to execute a method for controlling a communication terminal configured to acquire a landscape image, generate a portrait image that is the acquired landscape image rotated in a predetermined direction, and transfer the generated portrait image to a printing device, the method comprising:

receiving, from the printing device, attribute information indicating whether a post-processing position is to be determined with reference to the acquired landscape image yet to be rotated;

receiving, from a user, designation of a post-processing position on the acquired landscape image;

determining a post-processing position to be transmitted to the printing device based on the received attribute information and the received post-processing position; and transmitting the determined post-processing position to the printing device.

2. The storage medium according to claim 1, the method further comprising displaying a horizontal preview image of the acquired landscape image based on the received attribute information; and receiving the designation of the post-processing position via a screen on which the horizontal preview image is being displayed.

3. A method of controlling a communication device configured to acquire a landscape image, generate a portrait image that is the acquired landscape image rotated in a predetermined direction, and transfer the generated portrait image to a printing device, the method comprising:

receiving, from the printing device, attribute information indicating whether a post-processing position is to be determined with reference to the acquired landscape image yet to be rotated;

receiving, from a user, designation of a post-processing position on the acquired landscape image;

determining a post-processing position to be transmitted to the printing device based on the received attribute information and the received post-processing position; and transmitting the determined post-processing position to the printing device to the printing device.

4. The method of controlling according to claim 3, the method further comprising displaying a horizontal preview image of the acquired landscape image based on the received attribute information; and receiving the designation of the post-processing position via a screen on which the horizontal preview image is being displayed.

5. The method of controlling according to claim 3, wherein the image yet to be rotated is the acquired landscape image.

6. The method of controlling according to claim 3, wherein the attribute information is attribute information indicating that the post-processing position is to be determined with reference to a direction in which a top of an image to be printed is an upside.

7. The method of controlling according to claim 3, further comprising:
    receiving another attribute information indicating whether the post-processing position is to be determined with reference to the rotated portrait image; and
    determining the post-processing position to be transmitted to the printing device based on the received attribute information, the other attribute information, and the received post-processing position.

8. The method of controlling according to claim 7, further comprising:
    transmitting information indicating that the post-processing position to be transmitted has been determined based on the acquired landscape image yet to be rotated, based on determining the post-processing position to be transmitted based on the acquired landscape image yet to be rotated.

9. The method of controlling according to claim 3, wherein the post-processing position to be transmitted is to be determined without the received post-processing position being rotated in the predetermined direction.

10. The method of controlling according to claim 6, wherein a direction in which a top of the acquired landscape image is an upside is a direction in which one of long edges of the acquired landscape image is an upside.

11. A method of controlling a communication terminal configured to acquire a landscape image, generate a portrait image that is the acquired landscape image rotated in a predetermined direction, and transfer the generated portrait image to a printing device, the method comprising:
    receiving, from the printing device, attribute information indicating whether a post-processing position is to be interpreted as a position in an image yet to be rotated;
    receiving, from a user, designation of a post-processing position on the acquired landscape image;
    determining a post-processing position to be transmitted to the printing device based on the received attribute information and the received post-processing position; and
    transmitting the determined post-processing position to the printing device.

12. The method of controlling according to claim 11, wherein the attribute information is attribute information indicating that the post-processing position is to be interpreted with reference to a direction in which a top of the acquired landscape image to be printed is an upside.

13. The method of controlling according to claim 12, wherein the direction in which the top of the acquired landscape image is an upside is a direction in which one of long edges of the acquired landscape image is an upside.

14. The method of controlling according to claim 11, further comprising:
    receiving another attribute information indicating whether the post-processing position is to be determined with reference to the rotated portrait image; and
    determining the post-processing position to be transmitted to the printing device based on the received attribute information, the other attribute information, and the received post-processing position.

15. The method of controlling according to claim 14, further comprising:
    transmitting information indicating that the post-processing position to be transmitted has been determined based on the acquired landscape image yet to be rotated, based on determining the post-processing position to be transmitted based on the acquired landscape image yet to be rotated.

16. The method of controlling according to claim 11, wherein the post-processing position to be transmitted is to be determined without the received post-processing position being rotated in the predetermined direction.

17. A communication device configured to acquire a landscape image, generate a portrait image that is the acquired landscape image rotated in a predetermined direction, and transfer the generated portrait image to a printing device, the communication device comprising:
    one or more processors configured to:
    receive, from the printing device, attribute information indicating whether a post-processing position is to be determined with reference to the acquired landscape image yet to be rotated;
    receive, from a user, designation of a post-processing position on the acquired landscape image;
    determining a post-processing position to be transmitted to the printing device based on the received attribute information and the received post-processing position; and
    transmit the determined post-processing position to the printing device.

* * * * *